United States Patent [19]
Estrem

[11] Patent Number: 5,193,598
[45] Date of Patent: Mar. 16, 1993

[54] PORTABLE SUPPORT STAND ATTACHABLE TO A SAWHORSE

[76] Inventor: Jim J. Estrem, 751 Brom La., Big Lake, Minn. 55309

[21] Appl. No.: 902,946

[22] Filed: Jun. 23, 1992

[51] Int. Cl.$^5$ .......................... B27C 9/02; B27B 25/10
[52] U.S. Cl. ...................... 144/287; 83/471.3; 83/574; 108/55.3; 108/97; 108/135; 144/286 R
[58] Field of Search .............. 108/55.3, 69, 97, 135; 83/471, 471.2, 471.3, 574; 144/1 R, 286 R, 286 A, 287

[56] References Cited

U.S. PATENT DOCUMENTS

| | | | |
|---|---|---|---|
| 1,684,840 | 6/1932 | Lehner | 144/287 |
| 3,695,189 | 10/1972 | Felder, Jr. | 144/287 |
| 4,335,765 | 6/1982 | Murphy | 144/286 R |
| 4,341,247 | 7/1982 | Price | 144/287 |
| 4,452,117 | 6/1984 | Brickner et al. | 82/467 |
| 4,694,720 | 9/1987 | Brickner, Jr. et al. | 83/471.3 |
| 4,753,279 | 6/1988 | Harris | 144/287 |
| 4,798,113 | 1/1989 | Viazanko | 144/287 |
| 4,860,807 | 8/1989 | Vacchiano | 144/286 R |
| 4,874,025 | 10/1989 | Cleveland | 144/287 |
| 4,964,450 | 10/1990 | Hughes et al. | 144/287 |
| 4,974,651 | 12/1990 | Carmon et al. | 144/286 R |
| 5,038,650 | 8/1991 | Hodge | 83/471.3 |
| 5,105,862 | 4/1992 | Skinner et al. | 144/287 |

OTHER PUBLICATIONS

*Fine Homebuilding* magazine, Mar. 1992; pp. 90, 110, 114.
*Woodworker's Supply*, Feb. 1992; p. 27.
*Bridge City Tool Works 1992 Catalog*, p. 17.

Primary Examiner—W. Donald Bray
Attorney, Agent, or Firm—Merchant, Gould, Smith, Edell, Welter & Schmidt

[57] ABSTRACT

A portable support stand having a platform for supporting the power tool or workpiece and brackets for releasably attaching the power tool to the platform. Right and left support arms are attached to the support stand for supporting the ends of the workpiece. An attachment mechanism connects the platform to a sawhorse so that the support arms are generally parallel to the longitudinal axis of the saw horse. The method of the present invention is directed to attaching a portable support stand to a sawhorse for supporting a power tool and a workpiece. The portable support stand is engaged with the top member of the sawhorse so that the support arms are generally parallel to the longitudinal axis of the top member. A power tool is then attached to the platform using the brackets provided.

18 Claims, 2 Drawing Sheets

PORTABLE SUPPORT STAND ATTACHABLE TO A SAWHORSE

FIELD OF THE INVENTION

The present invention relates to a power tool and workpiece support stand which is attachable to an ordinary sawhorse.

BACKGROUND OF THE INVENTION

The use of power tools requires a solid work surface which is at a height that is both comfortable and safe for the operator. The work surface must also be sufficiently portable to be easily moved around a work site. This is especially true at construction sites where there is generally no suitable work surface.

The type of work surface required depends on the power tools to be used and the type of workpiece supported. For long workpieces, such as pipes or lumber, the work surface needs to be sufficiently long to adequately support the ends of the workpiece to prevent sagging. However, work surfaces which are adequate to support long workpieces tend to be difficult to move due to their weight and length.

It is common in the construction industry for operators to locate their power tools on sheets of wood which are supported by two or more sawhorses. This arrangement lacks the strength for efficient and safe operation, as well as being extremely difficult to move around the work site. Additionally, since the work surface of the power tool tends to be above the work surface of the supporting member, the operator still needs to devise a mechanism for supporting the end portions of the workpiece to prevent sagging.

SUMMARY OF THE INVENTION

The present invention relates to a portable support stand which is attachable to an ordinary sawhorse.

The portable support stand has a platform for supporting a power tool and brackets for releasably attaching the power tool to the platform. Right and left support arms are attached to the support stand for supporting the ends of the workpiece. An attachment mechanism connects the platform to a sawhorse so that the support arms are generally parallel to the longitudinal axis of the saw horse.

The method of the present invention is directed to attaching a portable support stand to a sawhorse for supporting a power tool and a workpiece. The portable support stand is engaged with the top member of the sawhorse so that the support arms are generally parallel to the longitudinal axis of the top member. A power tool is then attached to the platform using the brackets provided.

DETAILED DESCRIPTION OF THE PREFERRED EMBODIMENT

Figure 1:
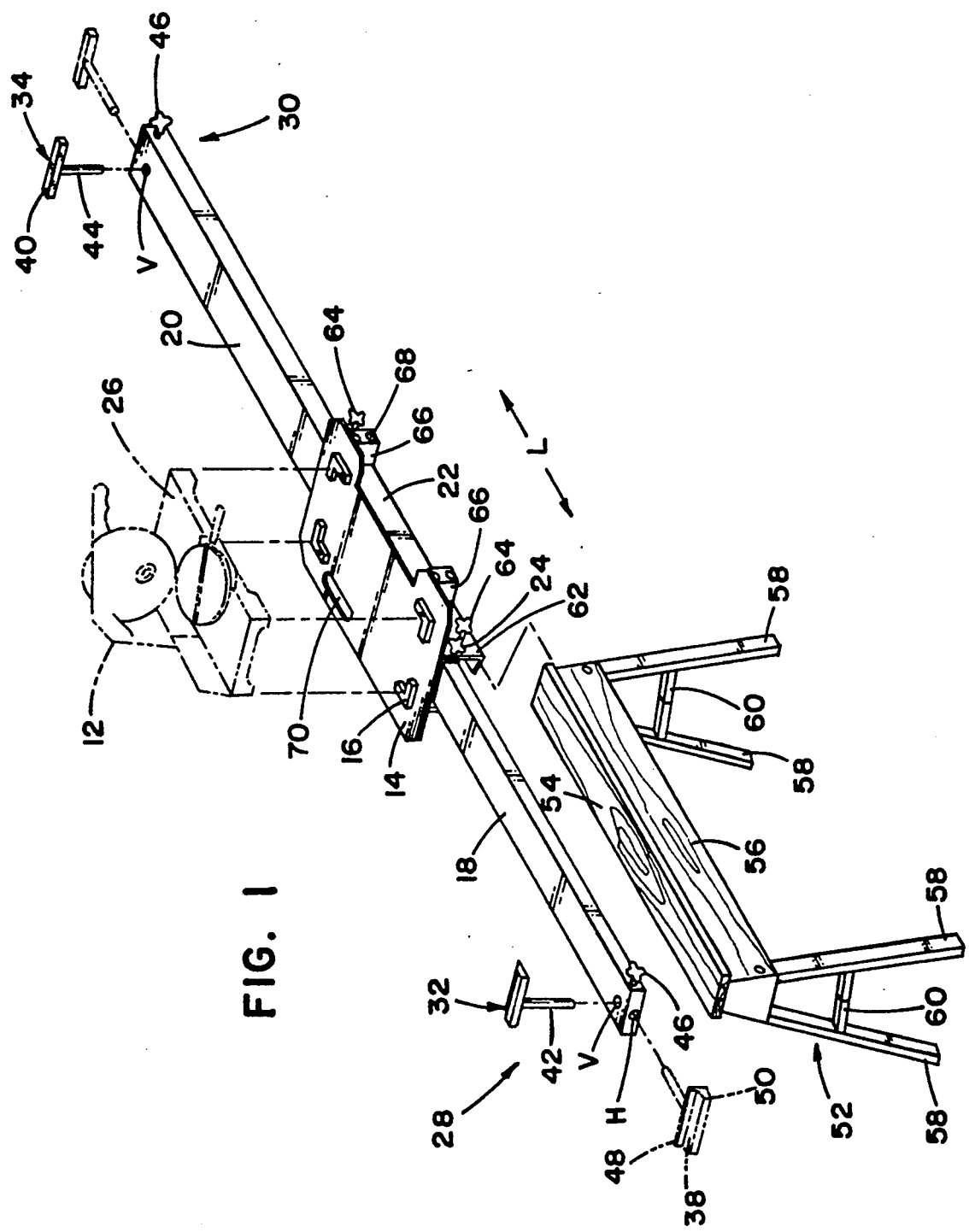
FIG. 1 is a perspective view of the preferred portable support stand illustrating engagement of the support stand with a sawhorse, and a power tool with the platform.

FIG. 1 illustrates the operational aspects of the preferred portable support stand 10 of the present invention. A power tool 12 is secured to a platform 14 by a series of power tool brackets 16. While FIG. 1 illustrates the power tool 12 as a miter saw, it will be understood by those skilled in the art that any of a variety of power tools may be attached to the platform. For example, the power tool may be a band saw, router, drill press, etc. Further, brackets of a different configuration may be required, depending on the particular power tool.

A left support arm 18 and right support arm 20 are operatively attached to the platform 14 by a support arm bracket 22 in a cantilever configuration. In the preferred embodiment, the left support arm 18 is telescopically engaged with the right support arm 20 so that it may be moved along the axis "L" from the extended position illustrated in FIG. 1 to a retracted position (see FIG. 3). A left support arm set screw 24 is provided on the support arm bracket 22 for releasably retaining the left support arm 18 in the desired position. Nylon pads (not shown) may be optionally included to facilitate the telescopic movement of the left support arm 18 relative to the right support arm 20. In the preferred embodiment, the support arms 18,20 may be constructed of light weight aluminum tubing, although those skilled in the art will recognize that a variety of suitable materials are available.

Alternatively, the left and right support arms 18,20 may be permanently fixed in the extended position. In this alternate configuration, the left and right support arms 18,20 are preferably constructed of a single continuous piece of material. In either of the embodiments discussed above, secondary support arms may be provided to increase the overall length of the portable support stand, preferably telescopically connected to the left and right support arms.

The power tool 12 has a work surface 26 which is above the level of the platform 14. Therefore, the ends portions of the support arms 28,30 are provided with end supports 32,34 for supporting the workpiece 36 (See FIG. 2) at the level of the power tool work surface 26. The end supports 32,34 preferably comprise support members 38,40 attached perpendicular to a support rod 42,44.

The support arms 18,20 have vertical holes "V" and horizonal hole "H" for receiving the support rods 42,44 proximate the end portions 28,30. The support rods 42,44 may be inserted in the vertical holes "V" to support the workpiece 36 and into the horizonal holes "H" for storage and transport. The support rods 42,44 are releasably retained in the vertical holes "V" and horizonal holes "H" by set screws 46.

Figure 3:
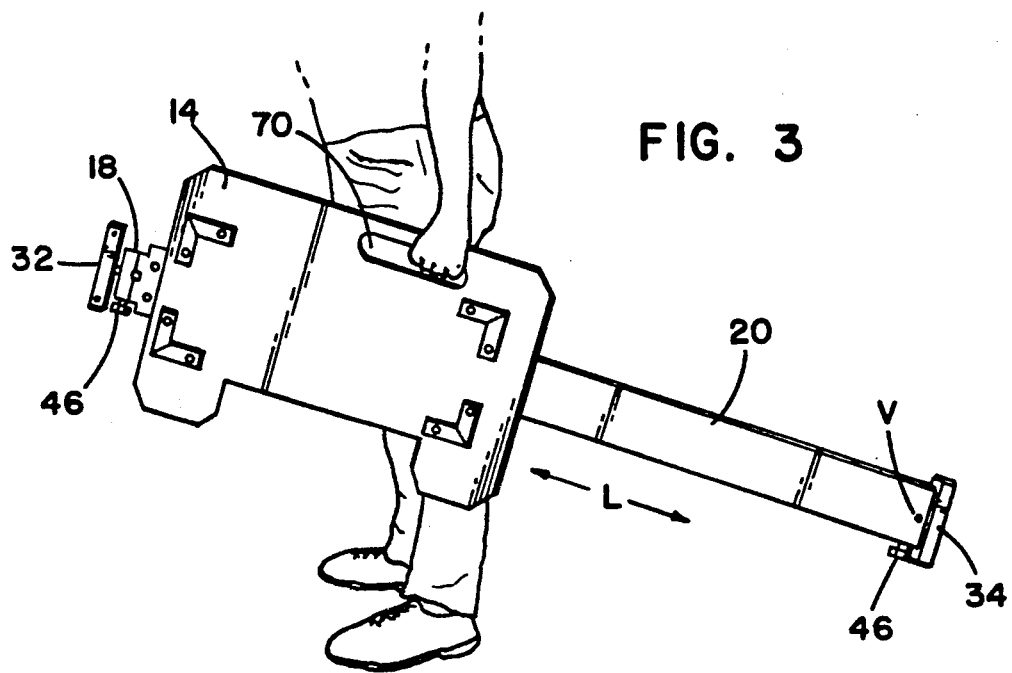
FIG. 3 illustrates the preferred portable support stand in its compacted form being transported by the operator.

The support member 38 of the left end support 32 is preferably L-shaped, having a horizonal portion 48 and a vertical portion 50. The L-shaped support member 38 performs several functions. The top surface of the vertical portion 50 may be used to support a workpiece 36, as illustrated in FIG. 3. Alternatively, the horizonal portion 48 of the L-shaped support member 38 can support the workpiece 36 while the vertical portion 50 operates as an end stop for holding the workpiece 36 in a fixed spatial relationship relative to the power tool 12. Using the left end support 32 as an end stop allows the operator to perform the same operation on a series of similar workpieces 36 with greater accuracy than could otherwise be achieved by manually positioning the workpiece.

The operator may also adjust the spacial relationship between the left end support 32 and the power tool 12 by releasing the left support arm set screw 24 and sliding the left support arm 18 to the desired location. The preferred configuration allows the operator to adjust the relative position between the left end support 32 and the power tool 12 from the operational locations (i.e., in front of the power tool). In an alternate embodiment not illustrated, it may be desirable to attach a measuring device to the left support arm 18 so that the position of the left end support 32 relative to the power tool 12 may be determined by the operator without having to manually measure the distance.

The right end support 34 is similarly situated with a support rod 44 releasably retained to the right support arm 20 by a set screw 46. While the right support member 40 is illustrated as a simple horizontal bar, it will be appreciated that it may be configured as an end stop, similar to the left end support 32. Further, while the cross-section of the preferred support rods 42,44 are circular, it will be understood that it may be desireable to use non-circular support rods to prevent the support members 38,40 from rotating, since the support members 38,40 are preferably retained perpendicular to the workpiece. Finally, while the support members 38,40 of the end supports 32,34 are illustrated as generally flat, it will be appreciated that the support members 38,40 may be shaped to better support various workpieces. For example, a generally circular support member may be better suited to support pipes or other round workpieces.

The sawhorse 52 illustrated in FIG. 1 is of a standard configuration having a top member 54 attached to a horizontal support 56. A pair of legs 58 are attached to each end of the horizonal support 56. Crossbars 60 are attached to each pair of legs 58 to provide additional stability for the sawhorse 52. The elongated top member 54 is preferably constructed of wood, having a cross-section dimension of 2"×6". It will be appreciated by those skilled in the art that the top member 54 can be constructed of a variety of materials and be of various sizes.

The portable support stand 10 is preferably attached to the top member 54 of the sawhorse 52 by a slide bracket 62. The slide bracket 62 may be attached to the support arm bracket 22, the platform 14, or some other suitable surface on the portable support stand. The slide bracket 62 is preferably configured to engage at least a portion of the four sides of the elongated top member 54. When attached to the saw horse 52, the left and right support arms 18,20 are generally parallel to the top member 54 of the sawhorse 52 in a cantilever configuration. A pair of slide bracket set screws 64 are provided for releasably securing the slide bracket 62 to the top member 54. The preferred slide bracket 62 is configured to engage a standard 2"×6" top member 54 on a conventional saw horse 52. However, it will be appreciated that the slide bracket 62 may be configured to operate with a variety of different sized top members 54. Further, while the preferred embodiment discloses a slide bracket 62 configuration for attaching the portable support stand 10 with the top member 54 of the saw horse 52, those skilled in the art will appreciate that a variety of attachment mechanisms are available for this purpose. For example, the slide bracket may be replaced by a series of clamping mechanisms.

Finally, the bottom front portion of the platform 14 has a pair of storage legs 66 with rubberized feet 68. As is generally illustrated in FIG. 3, the operator may set the portable support stand 10 on the ground so that the storage legs 66 maintain the platform 14 in a generally vertical position.

Figure 2:
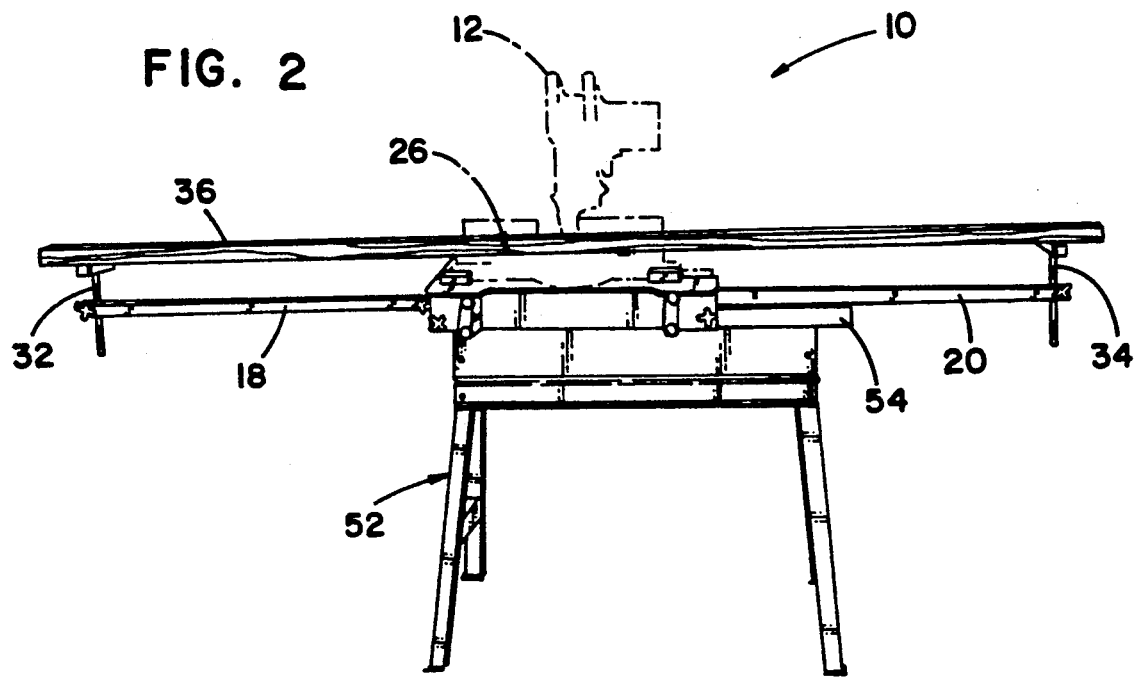
FIG. 2 is a front view of the preferred portable support stand supporting a workpiece on the work surface of a power tool.

FIG. 2 illustrates the preferred portable support stand 10 in the operational position supporting a workpiece 36. The left end support 32 and right end support 34 have been adjusted so that the ends of the workpiece 36 are at the same level as the power tool work surface 26. Because the left and right support arms 18,20 are generally parallel to the top member 54 of the sawhorse 52, sufficient lateral support is provided even for extremely long workpieces 36.

FIG. 3 illustrates the preferred portable support stand 10 detached from the sawhorse 52 for transport. The left support arm 18 is in the retracted position whereby it is telescopically enclosed within the right support arm 20. The left end support 32 and right end support 34 have been removed from their respective vertical holes "V" and inserted into the horizontal holes "H" in the ends of the support arms 18,20. The set screws 46 retain the end supports 32,34 in the support arms 18,20. A handle 70 is provided in the platform 14 for the operator. In this configuration, the portable support stand 10 is easily transported.

It is possible that the right support arm 20 may also be permitted to slide relative to the support arm bracket 22 along the axis "L". By permitting both the left and right support arms 18,20 to move relative to the support arm bracket 22, both support arms 18,20 may be centered relative to the platform 14 for purposes of transport.

The present invention is not limited to the examples discussed above, but may be changed or modified without departing from the spirit or scope of the invention. For example, the portable support stand may be constructed from a wide variety of materials. Further, the end supports may be shaped to accommodate different types of workpieces.

What is claimed is:

1. A portable support stand attachable to a saw horse for supporting a power tool and a workpiece, the saw horse having an elongated top member defining a first longitudinal axis, the portable support stand comprising:

a platform for supporting the power tool, the platform further including bracket means for releasably attaching the power tool to the top surface of the platform;

attachment means connected to the platform for attaching the platform to the top member of the sawhorse;

support arm bracket means for attaching at least one support arm to the platform, the support arm bracket means having a left and right end;

right support arm means for supporting the workpiece, the right support arm means having an inward end and an outward end, the inward end of the right support arm means being operatively engaged with the support arm bracket means proximate the right end thereof; and left support arm means for supporting the workpiece, the left support arm means having an inward end and, an outward end, the inward end of the left support arm means being operatively engaged with the support arm bracket means proximate the right end thereof, the right and left support arm means defining a second longitudinal axis generally parallel to the first longitudinal axis.

2. The apparatus of claim 1 wherein the attachment means further includes slide bracket means for slidably engaging with the top member of the sawhorse.

3. The apparatus of claim 2 wherein the attachment means further includes set screw means for releasably retaining the attachment means to top member of the saw horse.

4. The apparatus of claim 1 wherein the left support arm means is slidably engaged with the support arm bracket means so that the left support arm means can be moved between a extended position and a retracted position.

5. The apparatus of claim 4 further including set screw means for releasably retaining the left support arm means in any position between the extended and the retracted positions.

6. The apparatus of claim 4 wherein the left support arm means is telescopically engaged with the right support arm means so that the left support arm means is generally contained within the right support arm means in the retracted position.

7. The apparatus of claim 1 wherein the left and right support arm means are slidably engaged with the support arm bracket means so that the left and right support arm means can be moved between a extended position and a retracted position.

8. The apparatus of claim 1 wherein the left and right support arm means are constructed of aluminum tubing.

9. The apparatus of claim 1 further including left height adjustment means engaged proximate the outward end of the left support arm means for supporting the workpiece relative to the power tool.

10. The apparatus of claim 1 further including right height adjustment means engaged proximate the outward end of the right support arm means for supporting the workpiece relative to the power tool.

11. The apparatus of claim 9 wherein the left height adjustment means further includes end stop means for retaining the workpiece in a fixed spacial relationship relative to the power tool.

12. The apparatus of claim 1 further including left height adjustment means slidably engaged with the left support arm means proximate the outward end thereof and set screw means for releasably retaining the left height adjustment means at various heights relative to the power tool.

13. The apparatus of claim 1 further including right height adjustment means slidably engaged with the right support arm means proximate the outward end thereof and set screw means for releasably retaining the right height adjustment means at various heights relative to the power tool.

14. The apparatus of claim 12 wherein the left height adjustment means further includes end stop means for retaining the workpiece in a fixed spacial relationship relative to the power tool.

15. The apparatus of claim 4 further including handle means for carrying the portable support stand when the left support arm is in the retracted position.

16. The apparatus of claim 4 wherein the platform includes storage leg means for supporting the portable support stand when the left support arm is in the retracted position.

17. A portable support stand attachable to a saw horse for supporting a power tool and a workpiece, the saw horse having an elongated top member defining a first longitudinal axis, the portable support stand comprising:
    a platform for supporting the power tool, the platform having a top surface and a bottom surface, and further including bracket means for releasably attaching the power tool to the top surface of the platform;
    attachment means connected to the bottom surface of the platform for attaching the platform to the top member of the sawhorse, the attachment means further includes slide bracket means for slidably engaging with the top member of the sawhorse;
    support arm bracket means for attaching at least one support arm to the platform, the support arm bracket means having a left and right end;
    right support arm means for supporting the workpiece, the right support arm means having an inward and outward end, the inward end of the right support arm means being operatively engaged with the support arm bracket means proximate the right end thereof; and
    left support arm means for supporting the workpiece, the left support arm means having an inward and outward end, the inward end of the left support arm means being slidably engaged with the support arm bracket means so that the left support arm means can be moved between a extended position and a retracted position, the left and right support arm means defining a second longitudinal axis generally parallel to the first longitudinal axis.

18. A method of using a portable support stand attachable to a saw horse for supporting a power tool and a workpiece, comprising the steps of:
    a) providing a saw horse having an elongated top member defining a longitudinal axis;
    b) providing a portable support stand comprising platform for supporting the power tool, the platform having bracket means for releasably attaching the power tool to the platform, attachment means for attaching the platform to the top member of the sawhorse, and workpiece support arm means attached to the platform for supporting the workpiece;
    c) engaging the attachment means with the top member of the saw horse so that the support arm means are generally parallel to the longitudinal axis of the top member; and
    d) attaching the power tool to the platform with the bracket means.

* * * * *